United States Patent Office 3,592,940
Patented July 13, 1971

3,592,940
TRIGLYCERIDE COMPOSITION CONTAINING TITANIUM DIOXIDE
Camilo Quesada, Park Ridge, Ill., assignor to SCM Corporation, Cleveland, Ohio
No Drawing. Filed Apr. 24, 1968, Ser. No. 723,902
Int. Cl. A23l 1/27
U.S. Cl. 99—148                12 Claims

ABSTRACT OF THE DISCLOSURE

Lipoidal compositions containing (1) a lipid suitable for application to tissues of homeothermal animals, (2) at least one partial ester of a polyol, and (3) finely divided $TiO_2$ are described. The compositions are advantageous in that they can be used to whiten or to increase the light reflectance of products into which they are incorporated, and are further advantageous in that they form stable aqueous emulsions.

---

The invention relates to novel lipoidal compositions and more particularly to compositions containing a lipid, at least one partial ester of a polyol and finely divided $TiO_2$.

The invention is advantageous in that the compositions can be incorporated in comestible, cosmetic, and/or pharmaceutical products to whiten or to increase the light reflectance of such products. The invention is also advantageous in that the presence of $TiO_2$ in the compositions tends to stabilize aqueous emulsions formed from the compositions.

Examples of comestible products into which the lipoidal compositions of this invention can be incorporated include artificial dairy products such as coffee whiteners, filled milk, whipped toppings, sour cream substitutes, and the like; food coating compositions such as cake icings and enrobing compositions for candy; and beverages such as coffee, tea, and cocoa. Examples of cosmetic products include lipsticks, eye shadow, hand lotions, blemish cover lotions, and dentifrices. Examples of pharmaceutical products include dosage forms or carriers such as lotions, ointment bases, and suppositories.

The present invention provides a composition comprising a mixture of:
  (a) A lipid suitable for contact with tissues of homeothermal animals,
  (b) A minor amount of at least one partial ester of a polyol, and
  (c) Finely divided $TiO_2$; said $TiO_2$ being present in an amount sufficient for raising the light reflectance of said lipid.

Compositions falling within the scope above described can be incorporated in a wide variety of products to whiten and increase their light reflectance. The compositions also form stable emulsions when incorporated in aqueous media.

The term "homeothermal animals" as used herein is intended to mean and to refer to animals that maintain a uniform body temperature despite ambient variations in atmospheric temperature.

The term "finely divided food grade $TiO_2$" as used herein is intended to mean and to refer to $TiO_2$ particles in rutile or in anatase crystalline forms or in mixtures of these forms wherein the $TiO_2$ is substantially free from impurities and is certified by a controlling food and drug authority as suitable for use in foods. Such finely divided $TiO_2$ is also characterized in that it is composed of particles having an average ultimate particle size between about 0.1 to about 0.7 micron.

The term "pigmentary food grade $TiO_2$" as used herein is intended to refer to finely divided food grade $TiO_2$ wherein the particles have an average particle size between about 0.28 and 0.32 micron and a particle size distribution such that the preponderance of the particles have an ultimate particle size between 0.2 and 0.4 micron.

The term "lipid" as used herein is intended to mean and to refer to fatty materials other than partial esters of polyols and fatty acids which are usually insoluble in water, and have limited solubility in alcohol, but are usually soluble in ethers, esters, and organic solvents. The term "lipid" includes, for example, liquid and solid triglycerides and mixtures thereof which are composed of acyl (e.g., carboxylic acid) esters of glycerine having from 4 to 26 carbon atoms in the acyl groups; fatty oils including drying oils, semi-drying oils, and non-drying oils; full esters of fatty acids and polyols other than glycerine; essential oils including terpenes, aldehydes, and fatty alcohols; waxes (e.g., esters of sterols and fatty acids); sterols (high molecular weight alcohols) which are usually solid at 77° F.; soaps; phosphates such as lecithins which are fatty materials containing phosphorous; glycol lipids which are fatty lipids containing a carbohydrate moiety; sulfo-lipids which are fatty lipids containing a sulfur moiety; amino lipids which are fatty materials containing amino acid moieties.

Substantially all of the above-described lipids can be employed in the compositions of this invention. However, triglycerides are generally preferred because of their wide availability and low cost. Advantageous triglycerides are those derived from vegetable grains and other plants as well as animal fats. Examples of such glycerides are corn, olive, cottonseed, soybean, wheat germ, coconut, and tucum oils as well as animal tallow and cocoa butter. Such glycerides are usually mixtures of triglycerides containing stearic, oleic, linoleic, linolenic, and palmitic acid groups or radicals chemically combined with glycerine.

Triglycerides which have been found to be particularly advantageous for use in the compositions of this invention are those having a Solid Fat Index of at least 50 at 50° F., as determined by the American Oil Chemists Society—Method Cd—10–57, revised 1960 and a mean slope of at least 1.6 calculated by the formula:

$$\text{Slope} = \frac{A-B}{20}$$

where A is a Solid Fat Index at a temperature of about 20° F. below the Wiley Melting Point; B is the Solid Fat Index at the temperature (° F.) of the Wiley Melting Point being determined by the American Oil Chemists Society Method Cc—2–38. Lipids falling within the scope of the foregoing are triglyceride fats sometimes referred to in the art as hard butters and which are described in U.S. Pats. 2,726,158, and 2,783,151. Domestic hard butter glycerides are generally mixtures of naturally occurring triglycerides which are rearranged or interesterified to provide a Wiley Melting Point between 84° and 124° F., a Solid Fat Index of at least 50 at 50° F., and a hard and brittle consistency at around normal room temperatures. These hard butters generally break sharply and suddenly at about 75° F., the brittle quality sometimes being referred to as "snap." Hard butters are usually physically stable within the normal ranges of ambient temperatures. Lauric hard butters (e.g., those derived from palm kernel and coconut oils) and domestic hard butters (e.g., those derived from soybean and cottonseed oils) are usually mixtures of glycerides containing $C_{12}$, $C_{14}$, $C_{16}$, and $C_{18}$ fatty acids, although and, particularly in the case of lauric hard butters, they may also contain small amounts of $C_6$, $C_8$, $C_{10}$, and $C_{20}$ fatty acid moieties. Ordinarily, hard butters contain only minor proportions of unsaturated fatty acid moieties and are usually prepared by mixing hydrogenated or partially hydrogenated oils such as, for example, coconut oil, palm kernel oil, cottonseed oil, and soybean oil and heating the mixture under a blanket of inert gas in the presence of a transesterification or rearrangement catalyst such as, for example, sodium methoxide. Other glyceride oils of natural origin can also be catalytically rearranged to form hard butter type triglyceride fats having the properities hereinbefore described.

The amount of liquid employed in the compositions of this invention may vary from about 95% to about 99.99%, depending upon the contemplated end use of the compositions. Generally, compositions intended for food use will have a lipid content above about 98.5 to about 99.99 weight percent. For cosmetic or pharmacetutical useses, the lipid may be present in the compositions as low as about 95%.

The term "partial esters of polyols" as used herein is intended to mean and to refer to aliphatic compounds containing at least one hydroxyl group and at least one acyl group and are the reaction products of a polyol and an aliphatic carboxylic acid in which at least one of the hydroxyl groups of the polyol has been acylated and at least one of the hydroxyl groups of the polyol remains unreacted. Examples of such partial esters of polols include monoglycerides, diglycerides, and mixtures thereof which are composed of partial esters of glycerine and saturated, unsaturated or mixed saturated and unsaturated fatty acids having from 4 to 26 carbons in the acyl group. Other examples are products containing a preponderance of partial esters of glycerol such as the reaction product of hydrogenated vegetable or animal fat with glycerine in the presence of an alcoholysis catalyst. Such products are separated by distillation and are described in U.S. Pats. 2,634,234, 2,634,278 and 2,634,279. Advantageous partial esters of glycerine are concentrated, pre-formed monoglycerides having at least about 85% of $C_{14}$–$C_{22}$ fatty acid monoglyceride or mixtures of such fatty acid monoglycerides including a commercially available monoglyceride with a total monoglyceride content of 90% minimum. Such monoglyceride has an iodine value of below 2, a guaranteed minimum total monoglyceride content of 90%, a Lovibond color of about 2 red and 10 yellow, a free fatty acid concentration of about 0.6% and a capillary melting point of 154–156° F. These monoglycerides are usually partial esters of staric and palmitic acids wherein the ratio of steric to palmitic acid is about 74:26. Other partial esters which can be employed include diglycerides including vicinal and non-vicinal diglycerides such as, for example, 1,2- and 1,3-diglycerides and mixtures thereof. Typical 1,3-diglycerides (sometimes referred to as symmetrical diglycerides) are 1-stearoyl-3-palmitoyl diglycerides, 1,3-diolein; 1-stearoyl-3-olein; 1-palmitoyl-3-olein and the corresponding 1,2-diglycerides sometimes referred to as asymmetrical diglycerides.

Other suitable partial esters of polyols include monoesters of ethylene and propylene glycols in which the esters are those of aliphatic carboxylic acids containing from 4 to 22 carbon atoms in the acyl group. Still other partial esters are acyl esters of polyatomic alcohols having the empirical formula:

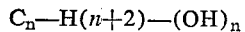

wherein $n$ is an integer of 4 or greater and where the term "polyatomic alcohol" refers to linear aliphatic polyhydric alcohols containing 4 or more carbon atoms wherein a hydroxyl group is attached to each carbon atom in the linear carbon atom chain of the alcohol. Examples of polyatomic alcohols whose partial esters can be employed are the tetratols (e.g., erythritol) which comprises the isomers of linear aliphatic polyatomic alcohols containing prior to partial esterification 4 carbon atoms and 4 hydroxyl groups; the pentitols (e.g., arabitol) which are isomers of polyatomic alcohols containing 5 carbon atoms and prior to partial esterification 5 hydroxyl groups; the hexitols (e.g., mannitol and sorbitol) which are isomers of polatomic alcohols containing 6 carbon atoms and prior to partial esterification 6 hydroxyl groups; the heptitols (e.g., perseite) which are polyatomic alcohols containing 7 carbon atoms and prior to partial esterification 7 hydroxyl groups and the like. Other partial esters of polyols include partial esters of 1,3-butylene glycol, partial esters of sugars such as glucose, dextrose, levulose, fructose and sucrose, polyoxyethylene sorbitan partial esters, sorbitan partial esters, and partial esters of polyglycerols.

All of the foregoing partial esters are prepared by reacting the polyol with an aliphatic saturated or unsaturated carboxylic acid, preferably a monocarboxylic acid containing from 4 to 26 carbon atoms in the aliphatic chain wherein the amount of carboxylic acid is below that sufficient to fully esterify the polyol. Other partial esters of polyols include partial esters of polyglycerols (e.g., polyglycerols containing between 2 to about 10 glyceryl units in the polyglycerol chain in which the acyl groups in the polyglycerol comprise from about 0.5 to about 2.5 acyl groups per glyceryl unit in the partial polyglycerol ester. The amount of partial ester of polyol which can be employed in the compositions of this invention will depend to an important extent upon the amount of $TiO_2$ which it is desired to use because, as will be hereinafter evident, the partial ester tends to act as a suspending agent for the $TiO_2$ particles.

The partial ester of polyol is advantageously employed in a partial polyol ester:$TiO_2$ weight ratio of between about 1:100 and about 10:1. Although ratios greater than 10:1 can be employed, there is usually no advantage and when ratios greater than 10:1 are employed, the compositions may sometimes be uneconomical. If ratios of less than 1:100 are employed, there is danger that the $TiO_2$ will not remain in suspension when the composition is employed to form aqueous emulsions. Generally speaking, partial polyol ester:$TiO_2$ ratios of between 1:10 and 10:1 are especially suitable in the compositions of this invention for most end use applications.

The finely divided food grade $TiO_2$ which can be employed in the compositions of this invention can be either rutile, anatase, or mixtures of these crystalline forms of $TiO_2$. The particular crystalline type will usually depend upon the intended end use of the composition because rutile $TiO_2$ tends to impart a pale bluish-white tinge or tint to compositions containing it whereas anatase $TiO_2$ tends to impart a pale redish or yellowish-white tinge or tint to the compositions. From the standpoint of particle size, food grade pigmentary $TiO_2$ is preferred because particles having the particle size of pigmentary $TiO_2$ particles are more efficient in reflecting light than are the non-pigmentary (e.g., smaller) $TiO_2$ particles. Since rutile $TiO_2$ has a density of about 4 grams per cm.³ and anatase $TiO_2$ has a density of 3 grams per cm.³, it was surprising to find that these materials, which have a significantly greater density than water and lipids, would form aqueous emulsions in which the $TiO_2$ particles do not separate but remain in the lipid phase and that the presence of $TiO_2$ tends to stabilize aqueous emulsions. In other words, the $TiO_2$ tends to prevent the aqueous emulsion from separating into lipid-water fractions. The compositions are prepared by intimately mixing the lipid, partial ester of polyol and the $TiO_2$ by any number of conventional methods such as by manual or mechanical grinding, milling, mulling, tumbling, agitation, and the like, and is usually accomplished by mechanical means. In order to insure intimate mixing, it is usually desirable that the lipid and partial ester be liquid. If either component is a solid or semi-solid, it should be liquified by heating or dissolving in a solvent. In many instances, the components are suitably mixed by blending them in a mechanical blender or a homogenizer while in the liquid state.

Although the components can be mixed simultaneously or in any order, it has been found preferable to prepare the compositions of this invention by first blending the $TiO_2$ and the polyol partial ester to form a uniform mixture or blend and thereafter to incorporate this mixture in the lipid because aqueous emulsions prepared from compositions made in this manner tend to be more stable than those in which all of the ingredients are directly blended. Additionally and particularly when the partial polyol ester:$TiO_2$ weight ratio is within the range of 1:100 to 10:1, preparation of the compositions by direct mixing often requires aging of the compositions before they can be employed in the preparation of aqueous emulsions.

The compositions of this invention are advantageously prepared by forming a blend of the polyol partial ester and $TiO_2$. In order to insure an intimate blending of the partial ester and $TiO_2$, it has sometimes been found desirable to heat the $TiO_2$ to a temperature of between about 257° F. or 125° C. and 932° F. or 500° C. to drive off residual atmospheric moisture prior to blending the $TiO_2$ with partial esters. Thereafter, the $TiO_2$ is cooled to room temperature or to about the melting point of the partial ester (in the event that the partial ester is solid) and is blended with the $TiO_2$ in accordance with any of the methods above described.

In some instances, such as, for example, where a large quantity of $TiO_2$ is desired, it has been found advantageous to conduct the blending operation in an inert atmosphere such as an atmosphere of nitrogen, argon, krypton or helium to obtain maximum absorption of the partial ester on the surface of the $TiO_2$ particles. The polyol partial ester:$TiO_2$ blend is then incorporated into the lipid by conventional mixing techniques.

The blend can be incorporated directly into the lipid where the lipid is a liquid but is advantageously incorporated into solid lipids by heating the lipid to liquify it in order to insure maximum homogeniety in the resulting composition. The partial ester:$TiO_2$ blend, when employed in the prepartion of the compositions of this invention is a small amount, usually between about 0.01 to about 5 weight percent, basis the weight of the lipid composition, and such an amount will whiten or increase the light reflectance of the lipid composition and formulations into which the lipid composition is incorporated. Although less than about 0.01 weight percent of blend can be employed, the products into which the lipid compositions are incorporated will sometimes not have the desired increase in light reflectance. Although more than about 5% of the partial ester:$TiO_2$ blend can sometimes be employed, there is usually no advantage and products containing such amounts of the lipid compositions may tend to be economically undesirable.

One advantageous embodiment falling within the scope of this invention is a composition comprising:

(a) A triglyceride fat, and (b) From about 0.01 to about 5 weight percent, basis the weight of the composition, of a blend of a partial ester selected from the group consisting of partial fatty acid esters of glycerol and partial fatty acid esters of lower alkylene glycols and pigmentary food grade $TiO_2$ wherein the blend has a partial ester:$TiO_2$ weight ratio of from about 1:10 to about 10:1.

Preferred compositions are those in which the partial ester consists of one or more of a monoglyceride such as, for example, glycerol monostearate, monopalmitate, or mono-oleate; or a diglyceride such as glycerol distearate, dipalmitate, or dioleate or a partial ester of a lower alkylene glycol, for example, ethylene glycol monostearate, monopalmitate, and monooleate; and propylene glycol monostearate, monopalmitate, and mono-oleate. Partial ester:$TiO_2$ blends containing these partial esters are preferred for reasons of economy, availability, and the fact that the compositions in which they are employed form stable aqueous emulsions.

From the foregoing, it is evident that formulations containing the lipid compositions of this invention usually contain only trace amounts of $TiO_2$. The lipid compositions are unique in that they make possible the suspension in aqueous media of $TiO_2$ which has a density of between 3 and 4 grams per cm.$^3$. As will be hereinafter evident from the specific examples, the $TiO_2$ surprisingly tends to stabilize aqueous emulsions in which the lipid compositions of this invention comprises the fatty or oil component.

The lipid compositions herein described can be used in conjunction with a wide variety of conventional food, cosmetic, and pharmaceutical components to provide products having increased light reflectance. Thus, for example, the lipid compositions can be incorporated in icings or confectionery enrobing coatings where white or pastel colors are desired. The lipid compositions can also be incorporated in ointments or supositories where they function as inert carriers of therapeutic agents.

One advantageous embodiment of the use of the lipid compositions of this invention comprises the incorporation of the compositions, usually the glyceride compositions, into non-dairy substitutes for coffee cream. Such products, called coffee whiteners, are sold on the market as a low-calorie substitute for coffee cream. They are advantageous in that they can contain up to 25% less of highly caloric lipid, which can usually be replaced by a lower caloric carbohydrate such as, for example, sucrose or corn syrup solids. The coffee whitener formulations are further advantageous in that they can be in liquid form or can be spray dried to form particulate products which are readily dispersible in beverages such as coffee, tea, or cocoa.

By way of example, a substitute non-dairy cream for coffee contains from 5–15 weight percent of the lipid compositions of this invention in conjunction with corn syrup solids, dispersing agents, such as, for example, sodium caseinate; gums such as acacia, tragacanth, or carrageen; buffer, mineral salt mixtures, conventional emulsifiers, and water. Although most conventional non-dairy cream substitutes produce liquids such as coffee or tea having a yellow or off-white color, the compositions of this invention when incorporated into whitening formulations, provide beverages having substantially the same color as beverages to which cream has been added.

The blend of partial ester and pigmentary $TiO_2$ when used having the preferred partial ester:$TiO_2$ weight ratio of between 1:10 and 10:1, can be employed in a wide variety of fat-containing comestible compositions. Thus, the invention also provides comestible compositions of enhanced whiteness comprising the lipoidal comestibles into which the partial ester:pigmentary $TiO_2$ blend has been incorporated. As will be evident from the specific examples, such comestibles include the aforementioned coffee whiteners, bakery coating compositions, and enrobing compositions for confectionery products.

The invention further provides cosmetics formulations and pharmaceutical carrier formulations of enhanced whiteness comprising the blend of partial ester of polyol and pigmentary $TiO_2$ above described. The oleophylic nature of the blend lends itself to incorporation by dispersion into lipoidal materials generally (e.g., phospholipids such as lecithins and hydroxylated lecithins, glycolipids, full esters of sorbitol, higher fatty alcohols, flaxes, and hydrophobic lipids generally).

The following specific examples are intended to illustrate the invention but not to limit the scope thereof, parts and percentages being by weight unless otherwise specified.

EXAMPLE 1

Four and eighty-five one hundredths (4.85) ounces of a melted lauric hard butter having the constants and composition listed below was blended with 0.11 oz. of food grade pigmentary anatase $TiO_2$ for 10 minutes in a Waring Blendor.

Lauric hard butter

Color: 1.5r–15y (max.)
Free fatty acid: 0.5% (max.)
Softening point: 92.3–94.1° F.
Wiley melting point: 101–103° F.
Iodine value: 3 (max.)
Refractive index: 30.7–31.7

Fatty acid content of lauric hard butter

[determined by vapor phase chromatography]

| Fatty acid: | Weight percent of total fatty acid content |
|---|---|
| Caproic | Trace |
| Caprylic | 5 |
| Capric | 4 |
| Lauric | 44 |
| Myristic | 15 |
| Palmitic | 9 |
| Stearic | 20 |
| Arachidic | Trace |
| Oleic (cis. and trans.) | 3 |

The $TiO_2$ had been heated for two hours in vacuo at between 302–338° F. to remove residual surface moisture.

To this blend, there was added 9.81 oz. of additional lauric hard butter (also in liquid form), 2.25 oz. of a product consisting of a mixture of glyceryl monostearate, glyceryl distearate, and glyceryl dioleate containing a minimum of 40% glyceryl monostearate and having a capillary melting point of 116–120° F. and an iodine value of 66, and 0.3 oz. of a product consisting of a mixture of glyceryl monostearate and glyceryl distearate and containing a minimum of 40% glyceryl monostearate and having a capillary melting point of 140–145° F. and an iodine value of 5. This composition was labeled Composition A and was set aside for evaluation in a coffee whitener as described below.

A lipoidal composition substantially the same as that of Composition A except that it did no contain $TiO_2$ was prepared as a control.

A liquid aqueous emulsion was prepared by mixing the following ingredients in the amounts listed below:

| Ingredient: | Percent |
|---|---|
| Composition A | 10 |
| Corn syrup solids | 10.23 |
| Sodium caseinate | 1.25 |
| Carrageen | .04 |
| Dipotassium phosphate | .30 |
| Water | 78.18 |

The composition was prepared by placing the ingredients in a Wiley Blender and heating and mixing them until the contents in the blender have a pasteurization temperature of 158° F. The resultant liquid was passed through a two-stage homogenizer operating at 2500 and 500 p.s.i. respectively. The resulting composition was cooled to 40–46° F. and stored for 24 hours. The lipid fractions did not separate from dispersion in the water and did not cream after standing for one week.

A control emulsion substantially the same as that described above except that it did not contain $TiO_2$ was also prepared. Creaming, that is, partial separation of the oil and water phases, occurred between 24 and 48 hours.

EXAMPLE 2

The following example illustrates the utility of the formulation described in the last three paragraphs of Example 1.

To a 6-oz. portion of freshly brewed coffee maintained at a temperature of 180° F., there was added 25 milliliters of the product (e.g., the oil-in-water coffee whitener emulsion) described in the third last paragraph of Example 1. To a similar 6-oz. portion of freshly brewed coffee maintained at the same temperature, there was added 25 milliliters of the control ($TiO_2$ free product). The coffee samples were measured for light reflectance with a direct reading reflectance colorimeter. The following reflectance measurements were obtained from the coffee samples.

| | Reflectance percent |
|---|---|
| Coffee containing $TiO_2$ emulsion | 56.5 |
| Coffee containing the $TiO_2$ free emulsion | 47.0 |

The amount of $TiO_2$ present in the $TiO_2$-containing coffee sample was 0.084 milligram of $TiO_2$ per milliliter of coffee (e.g., 84 parts of $TiO_2$ per million parts of liquid). The $TiO_2$-containing coffee was light brown in color resembling that of coffee to which cream had been added. The control coffee had a darker color.

The coffee samples were permitted to stand at room temperature for one hour after which the reflectance measurements were again taken and recorded. Substantially no change in reflectance had occurred. When $TiO_2$ was added to the control emulsion without first having been incorporated in the lipid composition of this invention and the resultant mixture was added to the coffee, the $TiO_2$ settled to the bottom of the coffee cup within 15 minutes and the reflectance of the coffee sample was substantially below that of the modified $TiO_2$ coffee. When $TIO_2$ was added directly to hard butter that contained no partial esters and the product was dispersed in the coffee, the $TiO_2$ settled to the bottom of the coffee within a period of 10 minutes.

The results are unexpected when it is considered that the density of the $TiO_2$ is between 3 and 4 grams per cm.[3] and particles having this density would be expected to settle to the bottom of the coffee within a period of a few minutes.

EXAMPLE 3

The following spray dried product was prepared by mixing the ingredients in the amounts listed below and thereafter spray drying the formulation to remove the water.

| Ingredient: | Percent |
|---|---|
| Composition A | 20 |
| Dipotassium phosphate | 1 |
| Sucrose | 1.5 |
| Corn syrup solids | 25 |
| Sodium caseinate | 2.5 |
| Water | 50 |
| Flavor and color | Trace |

The above composition was prepared by dissolving the dipotassium phosphate in the water and dry mixing, in a separate container, the sugar, corn syrup solids, and sodium caseinate. The dry mix was then added to the dipotassium phosphate solution with thorough mixing to dissolve the added dry mix solids. Thereafter, Composition A was liquified and added to the last mentioned aqueous mixture which was heated to 165° F. and passed through a two-stage homogenizer operating at 2500 and 500 p.s.i., respectively. The resultant composition was conventionally spray dried until it contained less than one percent of water.

A similar spray dried composition substantially the same as that described above except that it was prepared from the control composition (which contained no $TiO_2$) of Composition "A" was also prepared.

EXAMPLE 4

The following example illustrates the utility of the formulation described in Example 3.

To a 6-oz. portion of freshly brewed coffee maintained at a temperature of 180° F., there was added 0.2 oz. of the spray dried product described in Example 3. To a similar 6-oz. portion of freshly brewed coffee maintained at the same temperature, there was added 0.2 oz. of the control ($TiO_2$ free) product. The coffee samples were measured for light reflectance with a direct reading reflectance colorimeter as in Example 2. The following reflectance measurements were obtained:

| | Reflectance percent |
|---|---|
| Coffee containing TiO₂ emulsion | 50 |
| Coffee containing the TiO₂ free emulsion | 41 |

The amount of $TiO_2$ present in the $TiO_2$-containing coffee sample was 0.083 milligram of $TiO_2$ per milliliter of coffee, representing 83 parts of $TiO_2$ per million parts of coffee liquid. When $TiO_2$ was added to the spray dried product and the resulting mixture incorporated in the coffee, the $TiO_2$ settled to the bottom of the coffee cup within 15 minutes.

EXAMPLE 5

A partial ester: $TiO_2$ blend was prepared by heating in vacuo 0.11 oz. of pigmentary food grade anatase $TiO_2$ at a temperature of between 302° F. and 338° F. for 2 hours after which the $TiO_2$ was cooled to room temperature and blended with 2.25 oz. of a liquified product consisting of a mixture of glycerol monostearate, glycerol distearate, and glycerol dioleate containing a minimum of 40% glycerol monostearate and having a capillary melting point of 116°–120° F. and an iodine value of 66 and 0.3% of a product consisting of a mixture of glycerol monostearate and glycerol distearate containing a minimum of 40% glycerol monostearate and having a capillary melting point of 140°–145° F. and an iodine value of 5. This blend was added to 14.66 oz. of a bleached, partially hydrogenated liquid winterized deodorized cottonseed oil having the following constants and fatty acid content:

Typical constants:
| | |
|---|---|
| Color | red max 3.0 |
| Free fatty acid | percent max 0.5 |
| Wiley melting point | ° F. max 68 |
| I.V. | 77 |

The oil had the following fatty acid composition determined by vapor phase chromatography:

| Fatty acid: | Percent |
|---|---|
| Myristic | 1 |
| Palmitic | 16 |
| Stearic | 4 |
| Palmitoleic | 1 |
| Oleic (cis. and trans.) | 61 |
| Linoleic | 17 |

Blending of the ingredients was accomplished in a Waring Blender. The mixture was labeled Composition B and set aside for evaluation as described below:

| Ingredient: | Percent |
|---|---|
| Composition B | 35.6 |
| Corn syrup solids | 13.0 |
| Sodium caseinate | 2.0 |
| Dipotassium phosphate | 0.2 |
| Mono- and di-glyceride emulsifiers | 0.4 |
| Water | 48.8 |

The emulsion was prepared by placing thhe ingredients in a Wiley Blender and heating them until the contents reached a pasteurization temperature of 158° F. The resultant liquid was passed through a two-stage homogenizer operating at 250 and 500 p.s.i., respctively. The homogenized composition was cooled to 39–47° F. and stored for 24 hours. It did not separate or cream after standing for one week. A control composition substantially identical to that of the above-described emulsion except that it did not contain $TiO_2$ was prepared. Creaming occurred within 24–48 hours.

When the composition described above was evaluated as a coffee whitener using the procedure described in Example 4, substantially the same results (e.g., increase in light reflectance and absence of settling of $TiO_2$) are obtained. When pigmentary food grade rutile $TiO_2$ is substituted for the pigmentary food grade anatase $TiO_2$ in the compositions described in Example 1 and Example 5 and these compositions are evaluated in hot coffee using the procedure described in Example 3, substantially the same whitening and increase in light reflectance is obtained as well as the lack of settling of $TiO_2$ in the coffee.

EXAMPLE 6

A partial polyol ester:$TiO_2$ blend was prepared by mixing 88 grams of a product consisting of a mixture of glycerol monostearate and glycerol distearate containing a minimum of 40% glycerol monostearate and having a capillary melting point of 140–145° F. and an iodine value of 5 with 33.5 grams of a mixture of pigmentary food grade rutile and anatase $TiO_2$. The $TiO_2$ had been heated to remove moisture as described in Example 1. The resultant blend was incorporated into one kilogram of olive oil to provide a liquid triglyceride composition containing about 3.0% $TiO_2$. The composition was substantially white in color and could be incorporated in conventional lipstick formulations in as little as 0.01% to provide a pastel-like tint to the lipsticks. Such lipstick formulations containing 10 milligrams of this composition contain 300 parts of $TiO_2$ per million parts of lipstick formulation.

EXAMPLE 7

The composition of Example 1 was incorporated in a standard pharmaceutical lotion base having the ingredients in the amounts listed below:

| | | |
|---|---|---|
| Glycerol monostearate S | g | 35 |
| Stearic acid | g | 25 |
| Anhydrous lanolin | g | 9 |
| Composition A [1] | g | 1 |
| Alcohol | cc | 50 |
| Triethanolamine | cc | 10 |
| Perfume | cc | 1 |
| Distilled water | cc | 819 |

[1] Substituted for an equivalent weight of lanolin.

The above composition was prepared by melting the glycerol monostearate, stearic acid, propylene glycol, anhydrous lanolin, and glyceride composition at 194° F. while adding 100 grams of distilled water. The triethanolamine and 50 grams of distilled water were placed in a separate container and heated to 194° F., and this mixture was slowly added to the first-mentioned mixture during rapid agitation. The balance of the distilled water was then added while agitation was continued. Thereafter, the perfume was dissolved in the alcohol and added to the cooled lotion. The resulting product was a milk-white liquid which could be applied over blemishes on the skin to mask the blemishes.

The resulting product was white and had a high light reflectance and could be used to cover moles, birthmarks, scars, and to mask or cover other skin blemishes.

EXAMPLE 8

A coating for bakery products is prepared using the partial polyol ester:$TiO_2$ blend and glyceride prepared in Example 1. The formula has the following compositions:

| | Percent |
|---|---|
| Dextrose | 91.6 |
| Vegetable shortening | 6.5 |
| Glyceride composition A | 1.5 |
| Corn starch | .4 |
| Flavoring | Traces |

The resulting composition is prepared by melting the shortening and glyceride composition and spraying the melted shortening into the dextrose so that the dextrose blends are coated and mixed with a film of the composition. Thereafter, flavoring materials were added and blended along with the corn starch. The resulting mixture is a powder coating which can be used to coat doughnuts, cakes, and the like.

EXAMPLE 9

A partial polyol ester:$TiO_2$ blend was prepared by mixing under a helium atmosphere 88.6 grams of the partial ester product described in Example 7 and 40.0 grams of pigmentary $TiO_2$. The mixture was allowed to stand overnight. The partial polyol ester:$TiO_2$ blend was then mixed to a smooth consistency in a Waring Blendor under a helium atmosphere. The pigmentary $TiO_2$ was not subjected to any previous thermal treatment.

Seventeen and forty-five hundredths (17.45) oz. (wt.) of a lauric hard butter derived from a blend of hydrogenated lauric and domestic vegetable oils and having the following constants was liquified by heating to a temperature above its melting point.

Color: 1.5r–15y (max.)
Free fatty acid: 0.05% max.
Softening point: 95.9° F.–99.5° F.
Wiley melting point: 112°–114° F.
Iodine value: 3 max.
Refractive index at 48° C.: 31.5–32.5

The hard butter was a glyceride having the following fatty acid composition as determined by vapor phase chromatography:

| Fatty acid: | Weight percent |
|---|---|
| Caproic | 0.2 |
| Caprylic | 5.7 |
| Capric | 4.6 |
| Lauric | 39.7 |
| Myristic | 13.9 |
| Palmitic | 13.8 |
| Stearic | 21.1 |
| Arachidic | — |
| Oleic (cis. and trans.) | 0.8 |

To this liquified hard buter, .561 oz. (wt.) of the blend described in the first paragraph were added and mixed in a Waring Blendor. The product was labeled Composition C. A control composition identical in all respects except that it did not contain $TiO_2$ was prepared in the same manner.

A liquid composition was prepared by mixing the ingredients listed below using mechanical agitation:

| Ingredient | Weight (oz.) | Percent |
|---|---|---|
| Composition C | 18.01 | 17.90 |
| Corn syrup solids | 25.00 | 24.80 |
| Sodium caseinate | 2.50 | 2.48 |
| Dipotassium phosphate | 1.00 | 0.99 |
| Sugar | 1.50 | 1.49 |
| Mono- and di-glyceride emulsifiers | 2.55 | 2.54 |
| Water | 50.00 | 49.70 |

The composition was prepared by placing the ingredients in a Wiley Blender and mixing until a pasteurization temperature of 165° F. was reached. The resulting liquid was passed through a two-stage homogenizer at 2500 and 500 p.s.i., respectively. The product consisted of an oil-in-water emulsion containing $TiO_2$ which was dispersed in the oil or glyceride phase. Immediately after homogenization, the liquid emulsion was gravity-fed into a Bowen Conical Type, Model BE607, spray drier. The air inlet temperature, the drying chamber temperature, and the air outlet temperature were maintained at 350°, 230°, and 205° F., respectively during the drying process. After drying, the resultant product, which contained less than 1% (wt.) moisture, consisted of a white granular powder having the composition listed below wherein the pigmentary $TiO_2$ constituted 0.349% by weight of the powder and was dispersed (or encapsulated) in the solid glyceride phase. This product was labeled Formulation I.

| Ingredient: | Weight percent |
|---|---|
| Composition C | 35.6 |
| Corn syrup solids | 49.5 |
| Sodium caseinate | 4.9 |
| Dipotassium phosphate | 2.0 |
| Sugar | 3.0 |
| Mono- and di-glyceride emulsifiers | 5.0 |

A control composition identical in all respects to that of the above-described composition except that it did not contain $TiO_2$ was also prepared. This dry powder had the composition listed below and was labeled Formulation I (Control).

| Ingredients: | Weight percent |
|---|---|
| Control composition C without $TiO_2$ | 34.90 |
| Corn syrup solids | 50.00 |
| Sodium caseinate | 5.00 |
| Dipotassium phosphate | 2.00 |
| Sugar | 3.00 |
| Mono- and di-glyceride emulsifiers | 5.10 |

A third composition in which .561 oz. (wt.) of the blend described in the first paragraph of this example were added to 14.65 oz. (wt.) of the lauric hard butter described in the second paragraph and labeled Composition D was also prepared. This 5.5% (basis wt. of powder) decrease in fat level was adjusted for by increasing the corn syrup solids level by (17.45−14.65=2.80 oz.) 2.80 oz., or 5.5% (wt. basis powder). This dry powder containing 0.349% $TiO_2$ encapsulated in the solid glyceride had the composition listed below and was labeled Formulation II.

| Ingredient: | Weight percent |
|---|---|
| Composition D | 30.10 |
| Corn syrup solids | 55.00 |
| Sodium caseinate | 4.94 |
| Dipotassium phosphate | 1.98 |
| Sugar | 2.96 |
| Mono- and di-glyceride emulsifiers | 5.04 |

A fourth composition in which 0.561 oz. (wt.) of the blend described in the first paragraph were added to 13.61 oz. (wt.) of the lauric hard butter described in the second paragraph and labeled Composition E. This 7.1% (wt. basis dry powder) decrease in fat level was adjusted for in part by increasing the corn syrup solids level by 2.80 oz. or 5.9% (wt. basis dry powder). This dry powder containing 0.349% $TiO_2$ encapsulated in the solid glyceride had the composition listed below and was labeled Formulation III.

| Ingredient: | Weight percent |
|---|---|
| Composition E | 28.50 |
| Corn syrup solids | 61.03 |
| Sodium caseinate | 5.03 |
| Dipotassium phosphate | 2.01 |
| Sugar | 3.02 |

EXAMPLE 10

The following example illustrates the utility of the composition of Example 9.

To each four separate 6-oz. portions of freshly brewed coffee maintained at a temperature of 180° F., there was added 0.2 oz. (wt.) of one of the three spray experimental spray dried products and the control product described in the preceding example.

Light reflectance readings were taken employing the procedure described in Example 2. The results are tabulated below.

| Formulation: | Light reflectance of coffee (percent) |
|---|---|
| I | 47.0 |
| II | 43.0 |
| III | 40.0 |
| I (control) | 37.5 |

Formulations I, II, and III exhibited no settling of $TiO_2$ in the coffee after 20 minutes. When $TiO_2$ was added directly to the coffee containing the control formulation, settling was noticeable within 10 minutes.

The subject of this patent application is similar to the subject matter contained in U.S. patent applications Ser. No.'s 723,900, 723,901, 723,920, and 723,921, filed respectively in the names of John V. Luck, Frederick R. Paulicka, Alexander E. Thomas, and Donald E. Miller and Cecelia R. Gilmore, and filed simultaneously with the present application and also assigned to the same assignee.

What is claimed is:
1. A comestible composition comprising a mixture of:
   (a) a edible triglyceride, and
   (b) a minor amount of at least one edible partial fatty acid ester of a polyol selected from the group consisting of monoesters of glycerine and monoesters of lower alkylene glycols blended with a finely divided food grade $TiO_2$, said $TiO_2$ being present in an amount sufficient to raise the light reflectance of said edible triglyceride, said blend having a partial fatty acid ester: $TiO_2$ weight ratio of from 1:10 to 10:1.
2. An aqueous emulsion containing the composition of claim 1.
3. A water-in-oil emulsion containing the composition of claim 1.
4. An oil-in-water emulsion containing the composition of claim 1.
5. The composition of claim 1 wherein the edible glyceride is hard butter.
6. The composition of claim 1 wherein the partial ester is a monoglyceride consisting of at least about 85% $C_{14}$–$C_{22}$ fatty acid monoglyceride having an iodine value of below 2.
7. The composition of claim 6 wherein the partial ester is a super glycerinated fat.
8. Comestible composition comprising:
   (a) an edible triglyceride fat, and
   (b) from about 0.01 to about 5 weight percent, basis the weight of the composition, of a blend consisting essentially of a pre-formed monoglyceride containing at least about 85% $C_{14}$–$C_{22}$ fatty acid monoglyceride having an iodine value below 2 and pigmentary $TiO_2$, said blend having a partial ester:$TiO_2$ weight ratio of from about 1:10 and 10:1.
9. The composition of claim 8 wherein the comestible is a "coffee whitener."
10. The composition of claim 9 wherein the coffee whitener consists of spray dried particles.
11. The composition of claim 8 wherein the comestible is a coating or enrobing composition.
12. The composition of claim 8 wherein the comestible is particulate.

References Cited

UNITED STATES PATENTS

| 2,479,836 | 8/1949 | Hoback et al. | 106—308F |
| 2,925,365 | 2/1960 | Nicholson et al. | 99—148X |
| 3,084,050 | 4/1963 | Holland et al. | 99—148UX |
| 3,149,039 | 9/1964 | Jeffries | 99—148UX |

FOREIGN PATENTS

| 8062/64 | 7/1960 | Japan | 106—308—0 |

OTHER REFERENCES

Mitsui "Improvement on dispersion of Inorganic Pigment by Surface Treatment," American Perfumer and Costmetics, vol. 80, August 1965, pp. 23–28.

"Atlas Emulsifiers for Coffee Whiteners," May 1965, Atlas Chemical Industries, Wilmington, Del. pp. 1–12.

JOSEPH M. GOLIAN, Primary Examiner

U.S. Cl. X.R.

99—63, 139, 118; 106—300, 308; 424—63, 64, 69, 49, 127